Dec. 6, 1960 W. H. HEWITT, JR 2,963,667
ADJUSTMENT OF ISOLATION RATIO OF FIELD DISPLACEMENT ISOLATORS
Filed Dec. 9, 1957 2 Sheets-Sheet 1
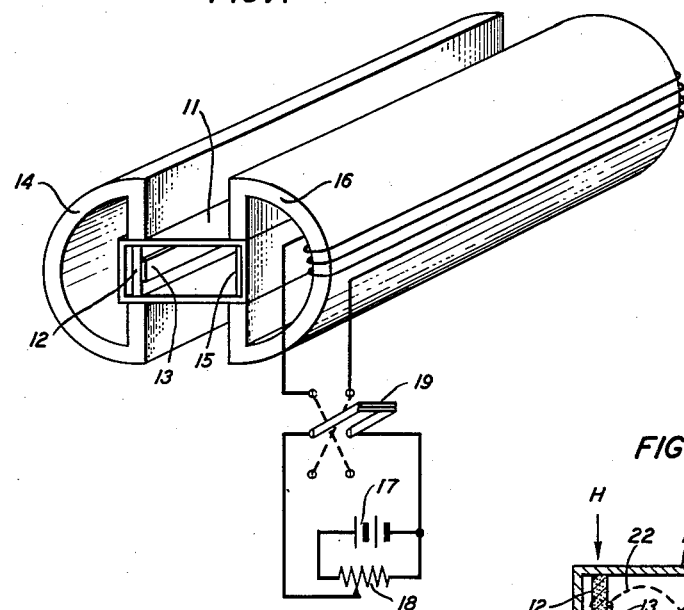
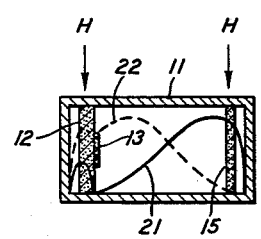
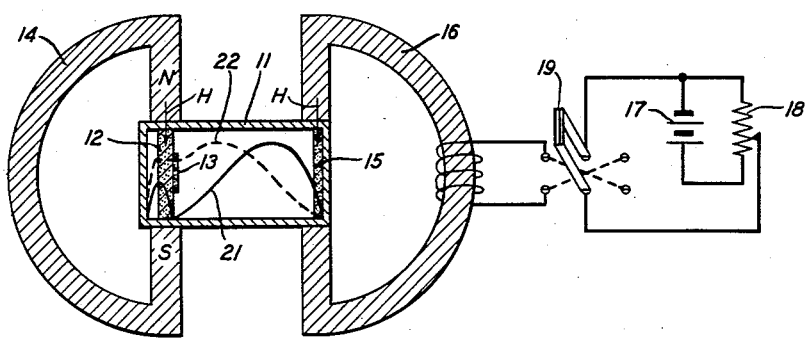
INVENTOR
W. H. HEWITT, JR.
BY
Walter M. Hill
ATTORNEY Dec. 6, 1960    W. H. HEWITT, JR    2,963,667
ADJUSTMENT OF ISOLATION RATIO OF FIELD DISPLACEMENT ISOLATORS
Filed Dec. 9, 1957    2 Sheets-Sheet 2

INVENTOR
W. H. HEWITT, JR.
BY
Walter M. Hill
ATTORNEY

United States Patent Office 2,963,667
Patented Dec. 6, 1960

2,963,667

ADJUSTMENT OF ISOLATION RATIO OF FIELD DISPLACEMENT ISOLATORS

William H. Hewitt, Jr., Mendham, N.J., assignor to Bell Telephone Laboratories, Incorporated, New York, N.Y., a corporation of New York Filed Dec. 9, 1957, Ser. No. 701,427

5 Claims. (Cl. 333—24)

This invention relates to nonreciprocal transmission devices for use in waveguide systems, and more particularly to an isolator of the field displacement type.

An isolator is defined as a circuit element which may be employed to isolate an electromagnetic device from other portions of an electromagnetic wave system, in the sense that waves may be freely transmitted in the direction from the device through the isolator to the system, designated the forward direction, but waves originating outside of the device, and traveling in the opposite direction, designated the reverse direction, are attenuated by the isolator to the extent required to prevent any deleterious reaction of the system upon the device to be isolated.

An isolator of the field displacement type is one which operates by virtue of a nonreciprocal action whereby the electromagnetic field pattern in a waveguide is modified or displaced so that the field pattern is materially different depending upon the direction of propagation of the wave through the isolator.

In this latter type of device, there is employed an element of gyromagnetic material, such as ferrite, having two parallel flat faces defining a thickness therebetween which is moderately critical in value relative to the free space wavelength of a given wave to be transmitted. The said element is most advantageously placed within a waveguide of rectangular cross section with the said faces parallel to the narrower side walls at a critical spacing therefrom, whereat the field pattern of wave transmission for one direction of propagation has substantially a null value of the electric field component at one face of the gyromagnetic element.

Resistive material for producing loss in the reverse direction is placed upon the said face in the null field region with the effect that substantially no attenuation results for a wave propagated in the forward direction. The gyromagnetic material reacts differently, however, to waves propagated in the respective directions, with the result that an electric field component of high intensity is developed at the location of the resistive material for a wave propagated in the reverse direction.

As disclosed in the copending application of S. Weisbaum, Serial No. 503,678, filed April 25, 1955, now Patent No. 2,834,947, if $\delta$ is used to represent the thickness of the gyromagnetic element between the parallel faces, $\gamma$ the spacing between one face and the nearest narrow side wall of a rectangular waveguide of longer side dimension L, $t$ the thickness of the resistive material (applied as a sheet or film upon the second face of the gyromagnetic material), and $\lambda_0$ the free spaced wavelength at the center of a desired frequency band, the best spacing is found to be determined by the formula $$\delta + \frac{\gamma}{2} - 2t = \frac{\lambda_0}{9.55}$$

for thicknesses of a resistive sheet of carbon coated polyethylene in the range of 0.003 to 0.009 inch and a midband frequency of 6175 megacycles per second. More generally, a relationship of $$\delta + \frac{\gamma}{2}$$

equal to a constant is found to hold for $\delta$ in the range of 0.175 to 0.200 inch. In general, the divisor of $\lambda_0$ differs from 9.55 if the resistive coating is a sprayed-on film instead of an attached sheet.

As mentioned above, and as can be seen from the formula, the transverse location of the gyromagnetic material within the guide and its thickness are critical factors. If the null does not occur in the region of the resistive coating, the forward directed wave as well as the reverse directed wave will be attenuated, and attenuation in the forward direction, of course, constitutes an undesirable loss. Ideally, the perfect isolator would have a forward loss of zero and a reverse loss of infinity. While neither zero attenuation nor infinite attenuation are achievable, forward losses as little as 0.2 decibel and reverse losses as high as 30 decibels may be realized in a properly adjusted isolator.

Although the thickness of the gyromagnetic material can be readily controlled in manufacture, the transverse location of the material to achieve coincidence of the field null and the resistive material still remains a critical and time consuming mechanical adjustment. Present practice requires a series of such mechanical adjustments before the desired reverse-to-forward loss ratio is obtained. Further, having achieved the desired result, variations in frequency, due to changes in ambient temperature and the like, will have the effect of displacing the null with respect to the resistive material, thereby degrading the reverse-to-forward loss ratio.

It is an object of the present invention to obtain a maximum reverse-to-forward loss ratio in a field displacement isolator, and more particularly to obtain a large reverse loss and a small forward loss.

It is a further object of the invention to more expeditiously achieve coincidence of the field null and the resistive material in a field displacement isolator.

Another object of the invention is to maintain the coincidence of the field null and the resistive material notwithstanding changes in frequency of the propagated energy.

In accordance with the principles of the present invention, a second, thin element of gyromagnetic material is located within the waveguide so as to be coextensive with, and parallel to, the main gyromagnetic element. A relatively small direct-current magnetic field is applied to this second element. By varying the field associated with the second element, the electric field distribution can be controlled, to a limited extent, so as to cause the position of the null to be transversely displaced with respect to the resistive material on the main gyromagnetic element. Thus, the effect achieved is equivalent to an actual movement of the main gyromagnetic element.

With electrical control of the transverse position of the field null, the aforementioned mechanical adjustments are substantially eliminated. Thus, the main gyromagnetic slab can be located approximately, mechanically, within the waveguide. The intensity of the magnetic field applied to the second, or auxiliary, gyromagnetic element is then adjusted until the desired reverse-to-forward loss ratio is obtained. Inasmuch as this latter adjustment can be done externally of the waveguide, there is no need of dismantling the guide each time a change is to be made.

A feature of the present invention lies in its use as a frequency compensating device. Since changes in frequency, either by intent or as a result of changes in ambient conditions such as temperature, will have the effect of shifting the position of the null, such changes will increase the forward loss. To compensate or correct for such shifting, the variable direct-current magnetic field applied to the auxiliary element can be controlled by the output of a frequency discriminator, the latter serving to provide an error voltage in response to frequency changes in the electromagnetic wave producing device.

Other objects and features of the invention will become apparent during the course of the following detailed description of the specific illustrative embodiments of the invention shown in the accompanying drawings.

In the drawings:

Fig. 1 is a perspective view of a field displacement isolator embodying the principles of the present invention;

Fig. 2 is a diagram illustrating the electric field intensities in the waveguide of Fig. 1 in the vicinity of the ferrite elements;

Fig. 3 is a diagram similar to that of Fig. 2 in which the second, or auxiliary, ferrite element is moved out from the adjacent narrow wall of the waveguide;

Figure 4:
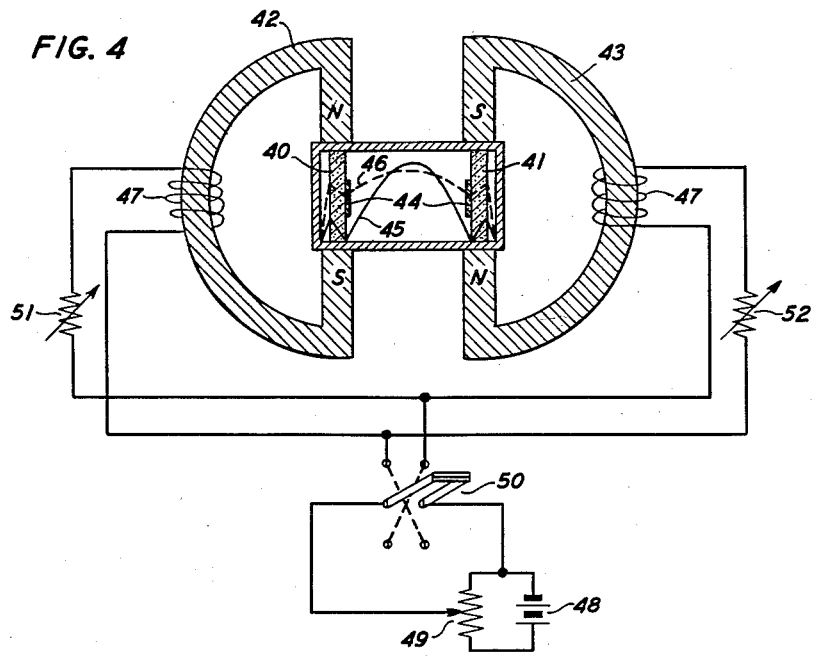
Fig. 4 illustrates another embodiment of the invention wherein a pair of symmetrically placed ferrite elements are each provided with resistive material and are magnetically polarized in opposite senses to substantially the same extent.

Referring now to Fig. 1 of the drawings, the hollow rectangular conducting section of waveguide 11 has an elongated element of gyromagnetic material 12 positioned therein at a critical distance from one of the narrow side walls. In addition, a resistive strip 13 is mounted on the inner side of the gyromagnetic element 12 within the waveguide 11. A permanent magnet 14 of generally U-shaped cross section magnetizes the element 12 transversely, as shown. A second gyromagnetic element 15 is mounted within the waveguide 11, against the opposite narow side wall, and an electromagnet 16 provides the transverse magnetization therefor. This second element 15 is thinner than the gyromagnetic element 12, and the magnetic field associated therewith is substantially less than that of element 12. By way of example, the field provided for this second, or auxiliary, element would generally be of the order of 200 oersteds or less, while that of the main element 12 would, in most cases, be approximately 2000 oersteds. Thus, the magnetically polarized gyromagnetic element 15 will affect the electric field distribution in the guide to only a limited extent.

The direct-current source 17 provides the necessary magnetization current for the electromagnet 16 and the potentiometer 18 permits a variable control over the same. The double pole double throw switch 19 facilitates reversing the polarity of the magnetization in the second gyromagnetic element 15.

While the gyromagnetic elements 12 and 15 are shown as being of a height equal to the narrow dimension of the waveguide, it should be understood that they would in practice be of a height somewhat less than said narrow dimension to reduce wave reflections.

The term "gyromagnetic material" is used in a generic sense herein and should be understood as including any of the number of feromagnetic materials which comprise an iron oxide in combination with one or more bivalent metals, such as nickel, magnesium, zinc, manganese and the like. These materials combine with the iron oxide in a spinel structure and are known as ferromagnetic spinels or as polycrystalline ferrites. In accordance with the usual practice, these materials are first powdered and then molded with a small percentage of binder material, such as chlorinated naphthaline, and then heat treated. As a specific example, the elements 12 and 15 may be of nickel-zinc ferrite of the approximate chemical formula $(Ni_{.3}Zn_{.7})Fe_2O_3$, prepared as noted above. In addition, commercially available samples of ferrite and finely powdered conducting feromagnetic dust in an insulating binder may be employed. As used in the present application and claims, the term "gyromagnetic material" is intended to apply to all materials having magnetic properties of the type disclosed in the article by D. Polder, which appeared in volume 40, pages 99–115 of the January 1949, Philosophic Magazine.

Considering for the moment only the main ferrite element, its presence influences the field pattern of the electromagnetic waves transmitted through the waveguide, the influence resulting in different field patterns for the two opposed directions of wave propagation. As disclosed in the above-noted copending application of S. Weisbaum, the main ferrite element is given such a thickness and is so spaced from the waveguide wall as to produce for one direction of wave propagation a wave pattern having a relatively low value of electric component of the field intensity at all times in a plane parallel to the longitudinal axis of the waveguide 11 lying in the region of the resistive strip 13. For wave propagation in the opposite direction, the electric component of the field intensity in this plane is found to have a relatively high value, particularly when the ferrite thickness and spacing and the resistive coating thickness are interrelated with the free space wavelength, in accordance with the above-mentioned formula $$\delta + \frac{\gamma}{2} - 2t = \frac{\lambda_0}{9.55}$$

The reason for this nonreciprocal effect is that the transversely magnetized element of gyromagnetic material 12 presents a permeability greater than one for wave propagation in one direction (whereby the concentration of the electric field distribution in the element is increased) and less than one for waves traveling in the opposite direction (whereby the concentration of the field distribution in the element is decreased).

The gyromagnetic element 15, which is located on the opposite side of the waveguide but magnetically biased in the same sense, produces the reverse effect. That is, it will exhibit a permeability greater than one for the direction of propagation in which the main gyromagnetic element 12 exhibits a permeability less than one, and conversely it exhibits a permeability of less than one when the main element 12 exhibits a permeability greater than one.

Fig. 2 shows in solid line 21 the approximate variation of the electric field intensity across the waveguide of Fig. 1 for the direction of wave propagation that results in minimum attenuation. Theoretically, in the absence of an electric component of field intensity, no energy is absorbed in the resistive material 13. Practically, however, the field intensity never completely disappears and thus a minimum of energy absorption is always observed. The broken line 22 shows the approximate variation of the electric component of field intensity for the reverse direction of wave propagation. As a result, there is an electric component of considerable intensity at the inner surface of the main element 12 so that the resistive strip 13 absorbs a large amount of energy from the wave, thereby causing a substantial attenuation of the same, i.e., a large reverse loss.

In Fig. 2, the transverse electric field for the forward direction (line 21) possess a null which is shown as coincident with the resistive strip 13. As previously noted, to achieve this coincidence is a time consuming procedure and further such coincidence once achieved may later be lost due to a change in the operating frequency. By virtue of the present invention this coincidence can now be more readily obtained and once obtained it can be preserved even though the operating frequency should shift.

By varying the magnetic field associated with the second, or auxiliary, ferrite element, the transverse electric field distribution can be controlled so as to cause the position of the null to be shifted with respect to the resistive strip 13. The field applied to this second element is kept relatively small so as not to distort or interfere substantially with the general transverse pattern produced by the main ferrite element. With magnetic field of the above-noted magnitudes, a 50 oersted variation in the field applied to the second ferrite element is sufficient to shift the null position approximately 0.010 inch, which is more than adequate for the purpose.

For purposes of explanation, assume in Fig. 2 that the field null and resistive strip are not coincident but rather that the null is positioned somewhat to the left of the plane of the resistive strip. To bring the null back into coincidence in this instance, it would be necessary to increase the strength of the magnetic field applied to ferrite element 15. This field increase has the effect of increasing the permeability of the ferrite for propagation in the forward direction (line 21). This increased permeability tends to distort or bulge the electric field pattern 21 toward the ferrite 15 to a greater extent. As the pattern is thus shifted toward the auxiliary ferrite 15, the null is necessarily brought back into coincidence with the resistive strip. Conversely, if the null is disposed to the right of the resistive strip, the variable magnetic field is decreased to bring about coincidence.

For the above discussion it was assumed that the element 15 was magnetically biased in the same sense as element 12. The same results may be achieved, however, should the element 15 be biased in the opposite sense, the direction of bias being determined, of course, by the position of switch 19. With the auxiliary ferrite 15 biased in the opposite sense, it will exhibit a permeability greater than one for the direction of propagation in which the main ferrite element 12 exhibits a permeability greater than one, and likewise it exhibits a permeability of less than one when the main element 12 exhibits a permeability less than one. Accordingly, since its effect is now reversed for a reversal of bias, the changes made in the field strength, to correct for shifts in the null position, are the reverse of those discussed above. If the null is located somewhat to the left of the plane of the resistive strip 13, it is necessary to decrease the strength of the magnetic field, and if the null is to the right of this plane, the field strength is increased.

Fig. 3 is substantially the same as Fig. 2 except for the fact that the auxiliary ferrite 15 is moved out from the adjacent narrow side wall of the waveguide. Reference to Fig. 2 will show that the electric field intensity for the forward direction (line 21) is substantially greater a short distance from said adjacent narrow side wall. Thus, the ferrite 15, positioned as shown in Fig. 3, exerts a greater effect upon the transverse electric field pattern for the same value of applied magnetic field.

Fig. 4 shows the application of the principles of the invention to a double slab field displacement isolator utilizing a main ferrite element on each side of the center of the waveguide. In the figure, the ferrite elements 40 and 41 are each mounted at a critical distance from a narrow side wall of the waveguide. Since the rotation of the magnetic vector of the traveling wave is in opposite senses in the two sides of the waveguide, it is necessary, in order to provide the same relationship between the externally applied magnetizing field and the rotating magnetic component of the field of the traveling wave on both sides of the center, that the direction of the externally applied magnetizing field be in the reverse sense through the respective ferrite elements. For this purpose the permanent magnets 42 and 43 of opposite polarity are provided. Each element 40 and 41 has a resistive strip 44 mounted on the side of the element nearer the center of the waveguide. The electric field distributions are shown in Fig. 4, the solid curve 45 being for wave propagation in the forward direction and the dotted curve 46 for the reverse direction.

The curves of Fig. 4 represent the electric field distributions for a completely symmetrical arrangement. That is, the ferrites are spaced the same critical distance from the narrow side walls, they are of the same thickness and are subjected to magnetic fields of equal intensity. If one or more of these conditions do not hold, either or both of the field nulls will be displaced from the respective resistive strips. This, of course, results in increased forward loss.

In accordance with the present invention, each permanent magnet is provided with a few turns of wire 47. The direct-current source 48 supplies the energizing current for the coils 47 and the potentiometer 49 permits control over the same. The double pole double throw switch 50 permits current reversal through the coils. In one direction of current flow the small magnetic fields created thereby will aid the fields of the permanent magnet, while in the other direction said small magnetic fields oppose the permanent magnet fields. The variable resistances 51 and 52 provide independent control over the energizing current in each coil.

As indicated previously, the thickness of the ferrite elements can be readily controlled in manufacture. Also, the ferrite slabs can be symmetrically positioned in the waveguide with a high degree of precision. The independent resistances 51 and 52 can be utilized to insure magnetic fields of equal intensity. However, the exact transverse positioning of the ferrites to achieve coincidence between the respective nulls and resistive strips is a time consuming process.

In the modification of Fig. 4 each ferrite performs a dual function in that each serves as a main ferrite element, in the manner previously described, and, in combination with the respective coils 47, each serves as an auxiliary tuning ferrite. Thus, should the field nulls be displaced either to one side or the other of the respective resistive strips 44, the current through the coils 47 can be controlled, by potentiometer 49 and switch 50, so as to bring the field nulls back into coincidence with strips 44. That is, if the pair of field nulls are not coincident with the respective resistive strips 44, the current through the coils 47 can be varied, in quantity and direction, until the desired reverse-to-forward loss ratio is obtained.

Figure 5:
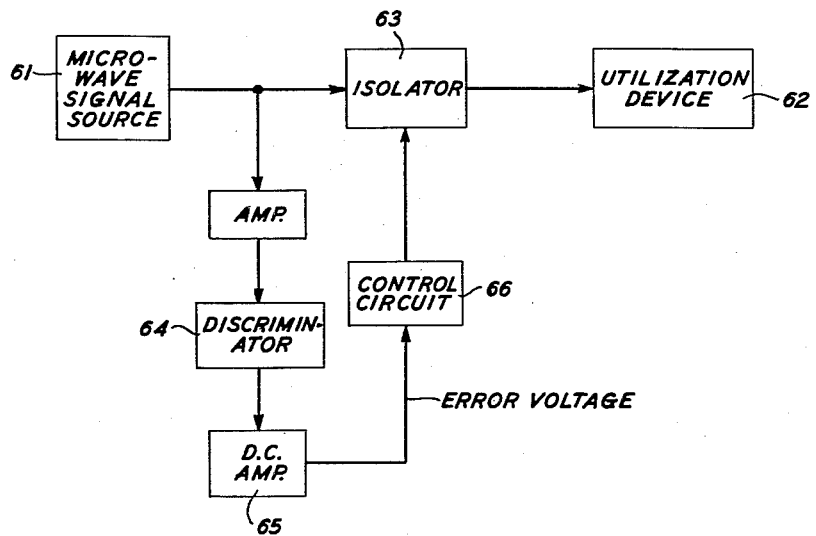
Fig. 5 is a block diagram of a frequency compensating system in accordance with the present invention.

Fig. 5 shows in block form a frequency compensating system in which microwave energy from source 61 is delivered to a utilization device 62, such as an antenna, via an isolator 63. The isolator serves as a one way transmission device preventing the travel of energy from device 62 back to the microwave source 61. The isolator may be of the type of Figs. 1–3, or alternatively of the type shown in Fig. 4.

In many instances it is desirable that the source 61 be periodically shifted in frequency. Such a shift, however, will be accompanied by a displacement of the field null with respect to the resistive strip, and this, of course, causes increased attenuation in the forward direction. Alternatively, unexpected shifts may occur in the frequency of the signal from source 61 as a result of changes in ambient conditions such as temperature. To compensate or correct for such shifts in frequency, the variable direct-current magnetic field applied to the auxiliary ferrite, or ferrites as the case may be, can be controlled by the output of a frequency discriminator, the latter serving to provide an error voltage in response to such frequency changes.

In accordance with the invention, a portion of the signal from source 61 is amplified and applied to the discriminator 64. Discriminator 64 is of standard design and serves to provide a direct-current error voltage which varies in magnitude and polarity in accordance with changes in the frequency of the applied signal. This error voltage is amplified in a direct-current amplifier 65 and applied to control circuit 66, which serves to increase or decrease the strength of the said variable direct-current magnetic field in accordance with magnitude and polarity changes in the error voltage. Thus, as frequency changes, the magnetic field applied to the auxiliary ferrite is correspondingly changed so as to maintain coincidene between the field null and the resistive strip.

In other instances where the gyromagnetic material is itself subjected to changes in ambient conditions, e.g., temperature, it may likewise be desirable to compensate or correct for the same. That is, the intensity of the field applied to the auxiliary ferrite may be controlled by the output of a temperature responsive device.

It is to be understood that the above-described arrangements are illustrative of the principles of the invention. Numerous other arrangements may be devised by those skilled in the art without departing from the spirit and scope of the invention.

What is claimed is:

1. In a system for the transmission of energy in a forward direction only, comprising a rectangular waveguide, an elongated element of magnetically polarizable material exhibiting the gyromagnetic effect at the frequency of said wave energy disposed within said waveguide, said element being of rectangular cross section and disposed with its long dimension parallel with the long dimension of said guide, the long dimension of the cross section of said element being disposed parallel with and spaced from one of the narrow side walls of the guide and to one side of the center of the guide in approximate coincidence with the position giving the optimal absorption ratio, for a preassigned frequency, of the attenuations of waves propagated in the forward and backward directions, a strip of resistive material on the wide face of said element removed from said narrow wall to attenuate energy propagated in a reverse direction, external means for establishing within said element a first steady magnetic bias field in a direction parallel with the wide face of the element and in a preassigned sense, thereby to establish, for said preassigned frequency and in approximate coincidence with said resistive strip, a null of the electric field vector of wave energy propagated in the forward direction, an auxiliary element of susbtantially similar configuration as said first element and of magnetically polarizable material, substantially thinner than the first and devoid of a resistive strip, disposed with its wide face parallel to the first element and within the region between the center of the guide and its opposite narrow wall, means for establishing within said auxiliary element a second steady magnetic bias field parallel to the first bias field in the same sense but of substantially smaller magnitude, thereby to modify the location of said null, and means for varying the magniture of said second bias field, thereby to move said null to exact coincidence with said resistive strip despite minor error in the location of the first element.

2. Apparatus as defined in claim 1 wherein said auxiliary element is disposed within said guide in contiguity with said opposite narrow wall.

3. Apparatus as defined in claim 1 wherein said auxiliary element is disposed within said guide in a transversely asymmetric position with respect to the element bearing said strip of resistive material.

4. Apparatus as defined in claim 1 wherein said first steady magnetic bias field is proportioned in magnitude to be of substanitally two thousand oersteds.

5. Apparatus as defined in claim 1 wherein the magnitudes of said first steady magnetic bias field and said second steady magnetic bias field are proportioned to be in the ratio of substantially ten to one.

References Cited in the file of this patent

UNITED STATES PATENTS 2,834,947     Weisbaum _____ May 13, 1958
2,849,683     Miller _____ Aug. 26, 1958

OTHER REFERENCES

Fox et al.: "Behavior and Applications of Ferrites in the Microwave Region," The Bell System Technical Journal, vol. 34, No. 1, January 1955, pages 5 to 103.

Weisbaum et al.: "Proceedings of the IRE," April 1956, pages 554–555.